US006965976B2

(12) United States Patent
Yamaguchi et al.

(10) Patent No.: US 6,965,976 B2
(45) Date of Patent: Nov. 15, 2005

(54) BACKUP METHOD ON A HIERARCHICAL BACKUP SYSTEM

(75) Inventors: Akihiko Yamaguchi, Yokohama (JP); Hideo Ohata, Fujisawa (JP); Tatsundo Aoshima, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 295 days.

(21) Appl. No.: 10/382,003

(22) Filed: Mar. 4, 2003

(65) Prior Publication Data
US 2004/0153753 A1  Aug. 5, 2004

(30) Foreign Application Priority Data
Nov. 11, 2002  (JP) ............................. 2002-326256

(51) Int. Cl.[7] .................... G06F 12/00; G06F 11/00
(52) U.S. Cl. ................ 711/162; 711/154; 711/161; 714/13
(58) Field of Search ............... 711/100, 147, 154, 711/161, 162, 118; 714/6, 7, 9, 13

(56) References Cited

U.S. PATENT DOCUMENTS

| | | | | |
|---|---|---|---|---|
| 5,276,865 A | * | 1/1994 | Thorpe | 714/24 |
| 5,454,099 A | * | 9/1995 | Myers et al. | 714/6 |
| 5,475,834 A | | 12/1995 | Anglin et al. | |
| 5,537,585 A | | 7/1996 | Blickenstaff et al. | |
| 5,539,875 A | | 7/1996 | Bishop et al. | |
| 5,758,359 A | * | 5/1998 | Saxon | 707/204 |
| 5,788,165 A | * | 8/1998 | Sakakibara et al. | 239/700 |
| 5,974,562 A | * | 10/1999 | Townsend et al. | 714/4 |
| 6,041,334 A | * | 3/2000 | Cannon | 707/204 |
| 6,154,853 A | * | 11/2000 | Kedem | 714/6 |
| 6,353,878 B1 | * | 3/2002 | Dunham | 711/162 |
| 6,366,987 B1 | * | 4/2002 | Tzelnic et al. | 711/162 |
| 6,430,622 B1 | * | 8/2002 | Aiken et al. | 709/245 |
| 6,453,325 B1 | | 9/2002 | Cabrera et al. | |
| 6,530,032 B1 | * | 3/2003 | Shew et al. | 714/4 |
| 2004/0073582 A1 | | 4/2004 | Spiegel | |
| 2004/0093361 A1 | | 5/2004 | Therrien et al. | |

FOREIGN PATENT DOCUMENTS

| | | | | |
|---|---|---|---|---|
| JP | 08-036502 | | 2/1996 | |
| WO | WO 200106367 A1 | * | 1/2001 | G06F 11/14 |

* cited by examiner

*Primary Examiner*—Tuan V. Thai
(74) *Attorney, Agent, or Firm*—Townsend and Townsend and Crew LLP

(57) ABSTRACT

If a failure occurs in a certain layer of a conventional hierarchical backup system, the lower layers are also affected by the failure. If, for instance, a failure occurs in the second layer, a backup process cannot be performed in the third layer so that an improper backup results in the fourth layer.

When a failure occurs in a certain layer of a hierarchical backup system of the present invention, the influence of the failure is minimized by causing a lower layer to substitute for the layer where the failure exists, by making backups skipping the layer where the failure exists, or by reducing the backup intervals for the lower layers.

5 Claims, 8 Drawing Sheets

FIG. 4

```
1, OK
2, ERROR
3, WARNING
4, OK
```

FIG. 5

```
O O O O, 1h c:¥JOB1_1,1d c:¥JOB2_1,1w c:¥JOB3_1,
O O O E, 1h c:¥JOB1_1,1d c:¥JOB2_1,,
O O O W, 1h c:¥JOB1_1,1d c:¥JOB2_1,1w c:¥JOB3_1,
O O E O, 1h c:¥JOB1_1,,1d c:¥JOB3_2,
O O W O, 1h c:¥JOB1_1,1d c:¥JOB2_1,1d c:¥JOB3_2,
O E O O,, 12h c:¥JOB2_2,1d c:¥JOB3_1,
O W O O, 1h c:¥JOB1_1,12h c:¥JOB2_2,1d c:¥JOB3_1,
E O O O,,,,
W O O O, 1h c:¥JOB1_1,12h c:¥JOB2_1,1d c:¥JOB3_1,
O O E E, 1h c:¥JOB1_1,,,
 . . .      . . .
```

FIG. 6

| FAILURE STATE | | | | MANAGEMENT SERVER PROCESSING | | | |
|---|---|---|---|---|---|---|---|
| 1ST LAYER | 2ND LAYER | 3RD LAYER | 4TH LAYER | INSTRUCTION TO 2ND LAYER | INSTRUCTION TO 3RD LAYER | INSTRUCTION TO 4TH LAYER |
| OK | OK | OK | OK | MAKE A SNAPSHOT COPY OF 1ST-LAYER DATA AT 1-HOUR INTERVALS | MAKE A BACKUP OF 2ND-LAYER DATA AT 1-DAY INTERVALS | MAKE A BACKUP OF 3RD-LAYER AT 1-WEEK INTERVALS |
| OK | OK | OK | ERROR | MAKE A SNAPSHOT COPY OF 1ST-LAYER DATA AT 1-HOUR INTERVALS | MAKE A BACKUP OF 2ND-LAYER DATA AT 1-DAY INTERVALS | DO NOT ISSUE A BACKUP EXECUTION INSTRUCTION |
| OK | OK | OK | WARNING | MAKE A SNAPSHOT COPY OF 1ST-LAYER DATA AT 1-HOUR INTERVALS | MAKE A BACKUP OF 2ND-LAYER DATA AT 1-DAY INTERVALS | MAKE A BACKUP OF 3RD-LAYER AT 1-WEEK INTERVALS |
| OK | OK | ERROR | OK | MAKE A SNAPSHOT COPY OF 1ST-LAYER DATA AT 1-HOUR INTERVALS | DO NOT ISSUE A BACKUP EXECUTION INSTRUCTION | MAKE A BACKUP OF 2ND-LAYER AT 1-DAY INTERVALS |
| OK | OK | WARNING | OK | MAKE A SNAPSHOT COPY OF 1ST-LAYER DATA AT 1-HOUR INTERVALS | MAKE A BACKUP OF 2ND-LAYER DATA AT 1-DAY INTERVALS | MAKE A BACKUP OF 2ND-LAYER AT 1-DAY INTERVALS |
| OK | ERROR | OK | OK | DO NOT ISSUE A SNAPSHOT COPY EXECUTION INSTRUCTION | MAKE A BACKUP OF 1ST-LAYER DATA AT 12-HOURS INTERVALS | MAKE A BACKUP OF 3RD-LAYER AT 1-DAY INTERVALS |
| OK | WARNING | OK | OK | MAKE A SNAPSHOT COPY OF 1ST-LAYER DATA AT 1-HOUR INTERVALS | MAKE A BACKUP OF 1ST-LAYER DATA AT 12-HOURS INTERVALS | MAKE A BACKUP OF 3RD-LAYER AT 1-DAY INTERVALS |
| ERROR | OK | OK | OK | DO NOT ISSUE A SNAPSHOT COPY EXECUTION INSTRUCTION | MAKE A BACKUP OF 1ST-LAYER DATA AT 12-HOURS INTERVALS | DO NOT ISSUE A BACKUP EXECUTION INSTRUCTION |
| WARNING | OK | OK | OK | MAKE A SNAPSHOT COPY OF 1ST-LAYER DATA AT 1-HOUR INTERVALS | MAKE A BACKUP OF 2ND-LAYER DATA AT 12-HOURS INTERVALS | MAKE A BACKUP OF 3RD-LAYER AT 1-DAY INTERVALS |
| OK | OK | ERROR | ERROR | MAKE A SNAPSHOT COPY OF 1ST-LAYER DATA AT 1-HOUR INTERVALS | DO NOT ISSUE A BACKUP EXECUTION INSTRUCTION | DO NOT ISSUE A BACKUP EXECUTION INSTRUCTION |

FIG. 7

| SCRIPT FILE NAME | SCRIPT FILE DESCRIPTION |
|---|---|
| c:¥JOB1_1 | INSTRUCTS THE PRIMARY STORAGE 103 TO MAKE A SNAPSHOT COPY OF A 1ST LAYER DISK |
| c:¥JOB2_1 | INSTRUCTS BACKUP SERVER 105 TO EXECUTE A JOB (BACKUP JOB 1003) FOR BACKING UP 2ND LAYER DATA TO THE SECONDARY STORAGE 104 |
| c:¥JOB2_2 | INSTRUCTS BACKUP SERVER 105 TO EXECUTE A JOB (BACKUP JOB 1004) FOR BACKING UP 1ST LAYER DATA TO THE SECONDARY STORAGE 104 |
| c:¥JOB3_1 | INSTRUCTS BACKUP SERVER 106 TO EXECUTE A JOB (BACKUP JOB 1005) FOR BACKING UP 3RD LAYER DATA TO THE MAGNETIC TAPE LIBRARY 107 |
| c:¥JOB3_2 | INSTRUCTS BACKUP SERVER 106 TO EXECUTE A JOB (BACKUP JOB 1006) FOR BACKING UP 2ND LAYER DATA TO THE MAGNETIC TAPE LIBRARY 107 |
| c:¥JOB3_3 | INSTRUCTS BACKUP SERVER 106 TO EXECUTE A JOB (BACKUP JOB 1007) FOR BACKING UP 3RD LAYER DATA TO THE MAGNETIC TAPE LIBRARY 107 |

FIG. 8

```
2, 1h, c:¥JOB1_1
3, 1d, c:¥JOB2_1
4, 1w, c:¥JOB3_1
```

BACKUP METHOD ON A HIERARCHICAL BACKUP SYSTEM

BACKGROUND OF THE INVENTION

The present invention relates to a data backup system for a computer, and more particularly to a data backup method for a hierarchical backup system that is formulated by combining a plurality of backup systems.

At present, various backup methods are used, including mirroring, snapshot, and backup on magnetic tapes, magnetic disks, and optical disks. All these methods have their advantages and disadvantages.

In mirroring, control is exercised to ensure that the same contents are always stored on a plurality of disks. Therefore, even if one of such disks becomes faulty, the current operation can be continued with another disk to minimize loss from a disk failure. However, if data deletion occurs due to a human operator error, software bug, or computer virus, the data on all the disks are deleted. In this sense, mirroring does not provide adequate data protection.

In situations where a snapshot copy of data is made on a periodic basis (this method is hereinafter referred to as the "snapshot method"), a previously saved snapshot copy remains unaffected even if the associated data is inadvertently deleted. If a failure occurs, however, recovery can only be achieved using the last snapshot copy. Therefore, this method is not suitable for operations where data is updated at intervals shorter than one minute. In general, it is difficult, in terms of cost, to manage many generations of snapshot copies. Old snapshot copies are sequentially overwritten by new ones so that the use of snapshot copies is not suitable for long-term storage of backup data.

The other means of backup include inexpensive disk drives, magnetic tapes, and optical disks. Making backups on inexpensive disk drives is generally superior in cost but inferior in performance to making snapshot copies. Making backups on magnetic tapes or optical disks is generally more superior in cost but more inferior in performance to making snapshot copies.

Although various backup methods are available, they have both advantages and disadvantages as described above. Under these circumstances, optimum methods have been employed for backup system construction in accordance with the properties of the data to be backed up. Also, a hierarchical backup system is now used in an increasing number of cases by hierarchically combining a plurality of backup means to exploit their advantages and offset their disadvantages (this system is hereinafter referred to as the "hierarchical backup system"). For example, the use of such a hierarchical backup system makes it possible to protect operations data by means of mirroring (first layer), make periodic snapshot copies to protect the data against software bugs and computer viruses (second layer), back up some snapshot copies on a magnetic disk to eliminate the risk of data loss, which may result when old snapshot copies are overwritten (third layer), and use a magnetic tape library to back up some backup data stored on a magnetic disk so that magnetic tapes can be removed and stored in a vault or at a remote place (fourth layer). It means that establishing a hierarchical backup system makes it possible to achieve failure recovery promptly and protect data not only from hardware faults but also from human operator errors, software bugs, computer viruses, and disasters.

However, if a failure occurs in a certain layer of a conventional hierarchical backup system, the failure affects the lower layers as well. If, for instance, a failure occurs in the second layer, no backup process can be performed in the third layer so that an improper backup results in the fourth layer.

The system disclosed by JP-A No. 36502/1996 consists of n units of equipment. In this system, k out of n units are activated for use while the remaining (n–k) units are designated as hot standby units. The system is configured so that the best k units are sequentially selected to determine the next active units. Even if a failure occurs in a certain unit within a hierarchical backup system that uses the above method, a certain standby unit becomes active and operates. Therefore, the hierarchical backup system can operate without causing any problem.

For the use of the above conventional technology, both active units and standby units need to be furnished. In a hierarchical backup system, which consists of various devices such a storage and server machine, various standby devices need to be furnished accordingly.

SUMMARY OF THE INVENTION

It is therefore an object of the present invention to provide a method for keeping the system running normally, without resorting to standby equipment, when a failure occurs in a certain layer of a hierarchical backup system.

In order to achieve the above object, according to the present invention, a backup method for a computer system having means for making optimum backups in accordance with an encountered failure state performs the following steps:

When determining the backup procedure (1) Investigating the failure states of all devices composing a hierarchical backup system (2) Determining the optimum backup procedure (backup flow, intervals, etc.) in accordance with an encountered failure state When performing a backup process (3) Instructing all devices composing the hierarchical backup system to perform a backup process in accordance with the optimum backup procedure determined in the above process Even when a failure occurs in a certain layer of a hierarchical backup system, the influence of the failure can be minimized by performing the above steps.

BRIEF DESCRIPTION OF THE DRAWINGS

FIG. 4 shows an example of failure state management information according to one embodiment;

FIG. 5 shows an example of information that is processed in the event of a failure according to one embodiment;

FIG. 6 is a table illustrating the relationship between failures and processes performed in various layers according to one embodiment;

FIG. 7 shows the contents of script files for use in one embodiment;

FIG. 8 shows an example of optimum processing information according to one embodiment;

DESCRIPTION OF THE PREFERRED EMBODIMENTS

One embodiment of the present invention will now be described with reference to the accompanying drawings. First of all, the system configuration of one embodiment will be described.

If a failure occurs in a certain layer of a hierarchical backup system of the present invention, the influence of the failure is minimized by causing a lower layer to substitute for the layer where the failure exists, by making backups skipping the layer where the failure exists, or by reducing the intervals at which data is backed up in the lower layers.

Figure 1:
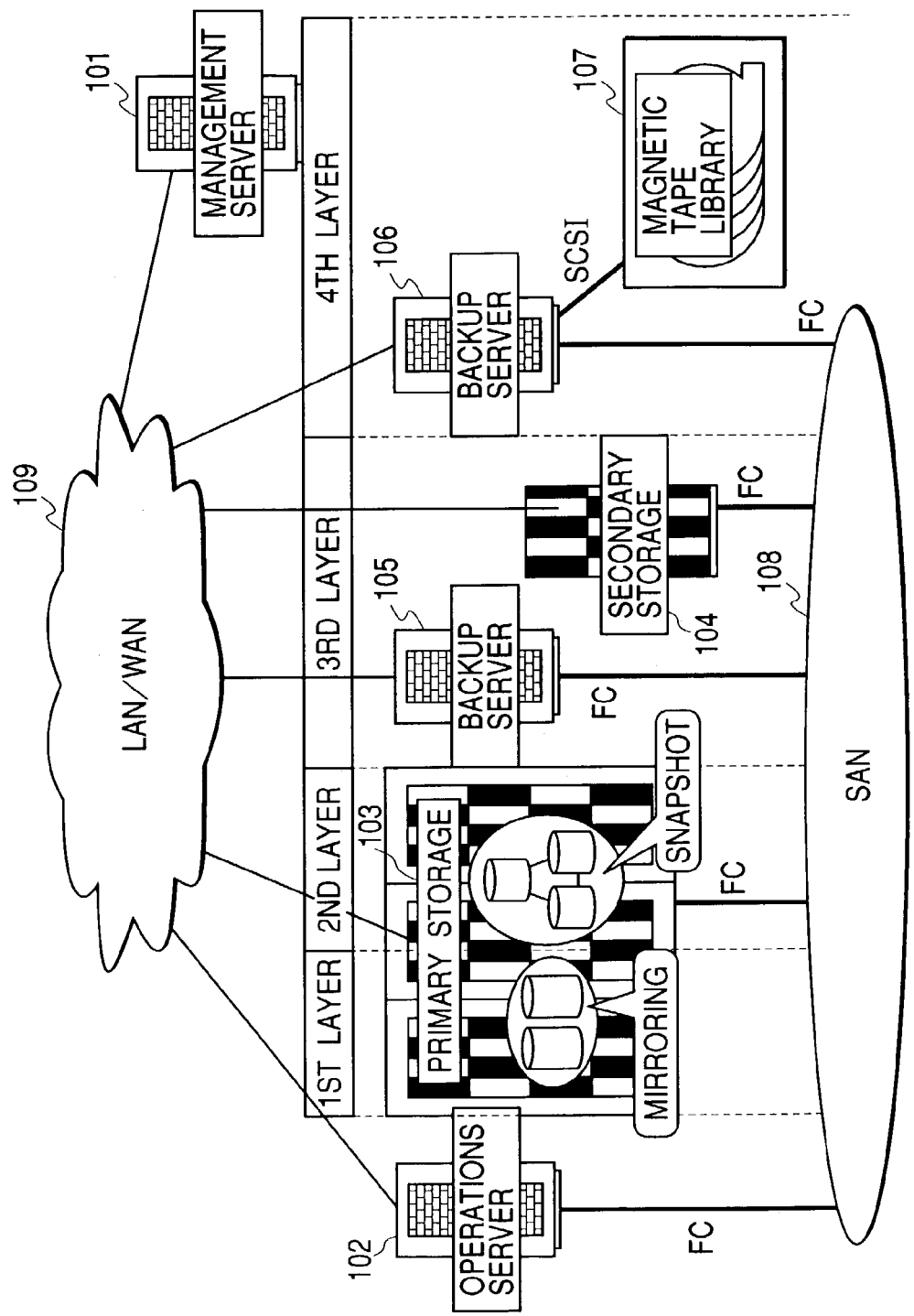
FIG. 1 illustrates the overall configuration of one embodiment.

FIG. 1 illustrates the overall configuration of an e-mail delivery system according to one embodiment of the present invention. As shown in FIG. 1, the hierarchical backup system according to one embodiment of the present invention comprises a management server 101, an operations server 102, a primary storage 103, a secondary storage 104, backup servers 105, 106, a magnetic tape library 107, a storage area network (SAN) 108, and a network (LAN, WAN, or the like) 109.

The management server 101, primary storage 103, secondary storage 104, and backup servers 105, 106 are interconnected via the network 109. Further, the primary storage 103, secondary storage 104, and backup servers 105, 106 are connected to the storage area network 108 via a Fibre Channel (hereinafter abbreviated to FC) cable. Backup server 106 is also connected to the magnetic tape library 107 via a SCSI. Although the configuration shown in FIG. 1 indicates that the magnetic tape library 107 is SCSI-connected to backup server 106, an alternative configuration may be used to FC-connect the magnetic tape library 107 to the storage area network 108.

The management server 101 controls the backup flow of the hierarchical backup system according to the present embodiment. This server 101 monitors the devices connected to the network 109 and issues data input/output instructions to the primary storage 103 and backup servers 105, 106 for the purpose of optimizing the flow of backup in accordance with the situation.

The operations server 102 has various functions for use during operations, including those of an operations application server, database server, and file server. This server 102 operates while referencing or updating the data stored in the primary storage 103.

The primary storage 103 stores data that is to be referenced or updated by the operations server 102. In the present embodiment, the primary storage 103 has a mirroring function and snapshot function to provide against failures. This storage 103 provides mirroring for data protection in the first layer of the hierarchical backup system and takes snapshots for data protection in the second layer of the hierarchical backup system.

The secondary storage 104 is a virtual tape library or other disk device that is less expensive than the primary storage 103. The secondary storage 104 is used to back up the data within the primary storage 103.

The backup servers 105, 106 control the backup to the secondary storage 104 and magnetic tape library 107, respectively. In the present embodiment, backup server 105's backup to the secondary storage 104 is executed in the third layer of the hierarchical backup system while backup server 106's backup to the magnetic tape library 107 is executed in the fourth layer of the hierarchical backup system. Although the configuration shown in FIG. 1 indicates that backup servers 105 and 106 use separate computers, an alternative configuration may be employed to incorporate the functions of backup servers 105 and 106 into a single computer.

The magnetic tape library 107 is a backup storage, which is controlled by backup server 106 for use in a backup job.

The primary storage 103, secondary storage 104, and backup servers 105, 106 have a failure notification function. If a failure occurs in any of these devices, the failure notification function reports the occurrence of the failure to the management server 101 via the network 109. Although the configuration shown in FIG. 1 indicates that the management server 101, backup server 105, and backup server 106 use separate computers, an alternative configuration may be used to implement these servers on a single computer. Although FIG. 1 indicates that the operations server 102, backup server 105, and backup server 106 use separate computers, an alternative configuration may be used to implement these servers on a single computer. In another alternative configuration, the management server 101, operations server 102, and backup servers 105 and 106 may be implemented on a single computer. In still another alternative configuration, the use of backup servers may be avoided by incorporating the function of backup server 105 into the firmware of secondary storage 104 and the function of backup server 106 into the firmware of magnetic tape library 107.

The management server 101 in FIG. 1 will now be described according to the present embodiment.

Figure 2:
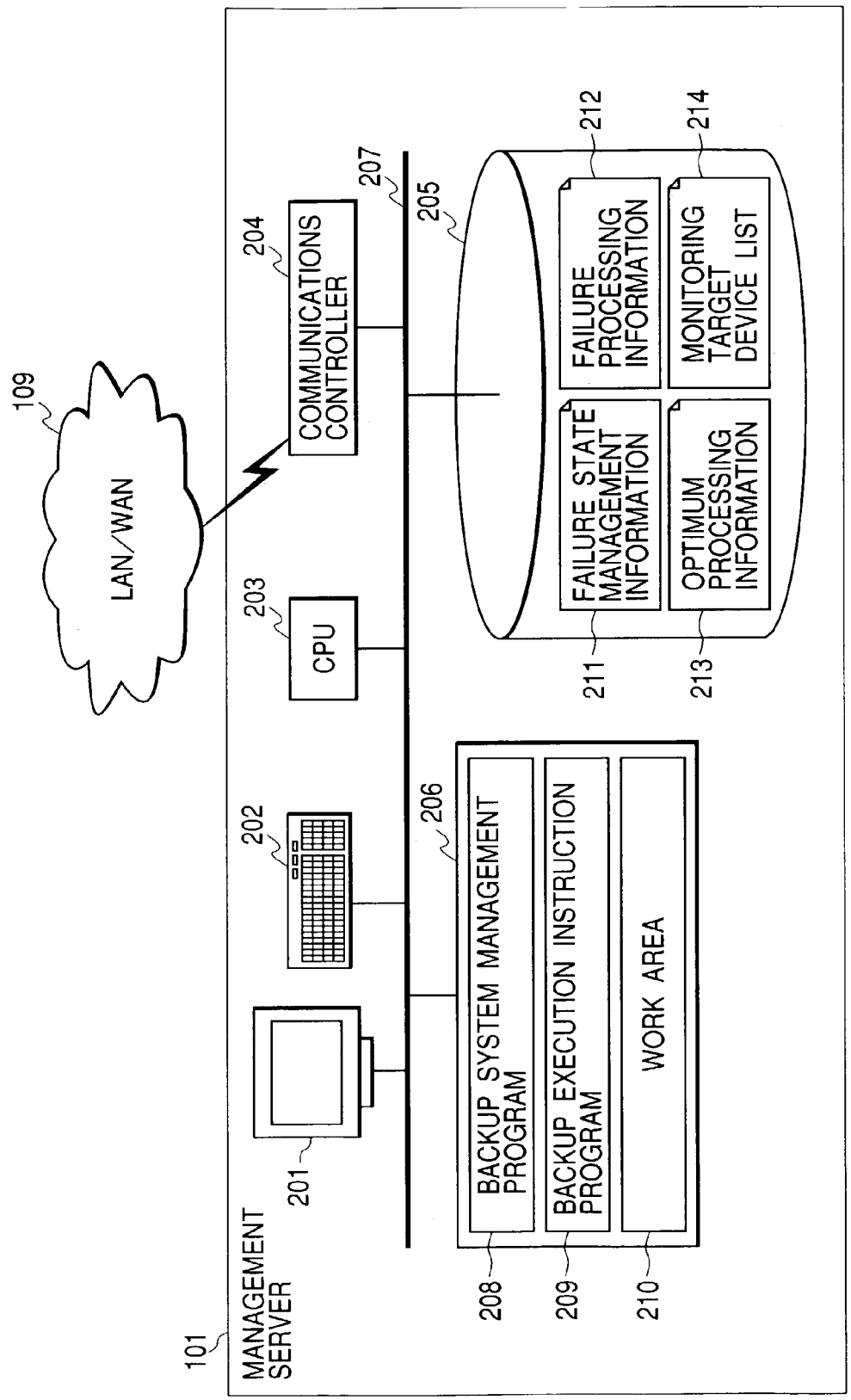
FIG. 2 illustrates the configuration of a management server according to one embodiment.

FIG. 2 illustrates the configuration of the management server 101 according to the present embodiment. The management server 101 shown in FIG. 2 comprises a display 201, an instruction input device 202, a central processing unit (CPU) 203, a communications controller 204, an external storage device 205, a main memory 206, and a system bus 207.

The display 201 is used to display the progress and result of process executions by the management server 101. The instruction input device 202 is a keyboard, mouse, or other device that is used to issue instructions to a computer, including those for activating a program. The central processing unit 203 executes various programs that compose the management server 101. The communications controller 204 is used to exchange various data and commands with the other devices connected to the network 109 via the network 109. The external storage device 205 is used to store various data for processes performed by the management server 101. The main memory 206 is used to store various programs and temporary data for processes performed by the management server 101. The system bus 207 is used to interconnect the devices described above.

The external storage device 205 stores failure state management information 211, failure processing information 212, optimum processing information 213, and monitoring target device list 214. These items of information are used by various programs that perform the processes of the management server 101.

The main memory 206 stores a backup system management program 208 and a backup execution instruction program 209 and contains a work area 210.

The work area 210 is used to store data that is required for program executions.

The backup system management program 208 determines the optimum backup flow as needed. This program 208 waits for a failure notification from the other devices connected to the network 109. Upon receipt of such a failure notification, the program 208 updates the failure state management information 211, references the failure processing information 212, and determines the backup flow that is currently optimum. Further, the program 208 stores the backup flow determination result in the optimum processing information 213.

The backup execution instruction program 209 issues a backup execution instruction in accordance with the flow that is found optimum by the backup system management program 208. This program 209 references the optimum processing information 213 periodically and issues a backup execution instruction to the primary storage 103 and backup servers 105, 106 in accordance with the optimum processing information.

The processing steps performed by the management server 101 of the present embodiment-will now be outlined.

Figure 3:
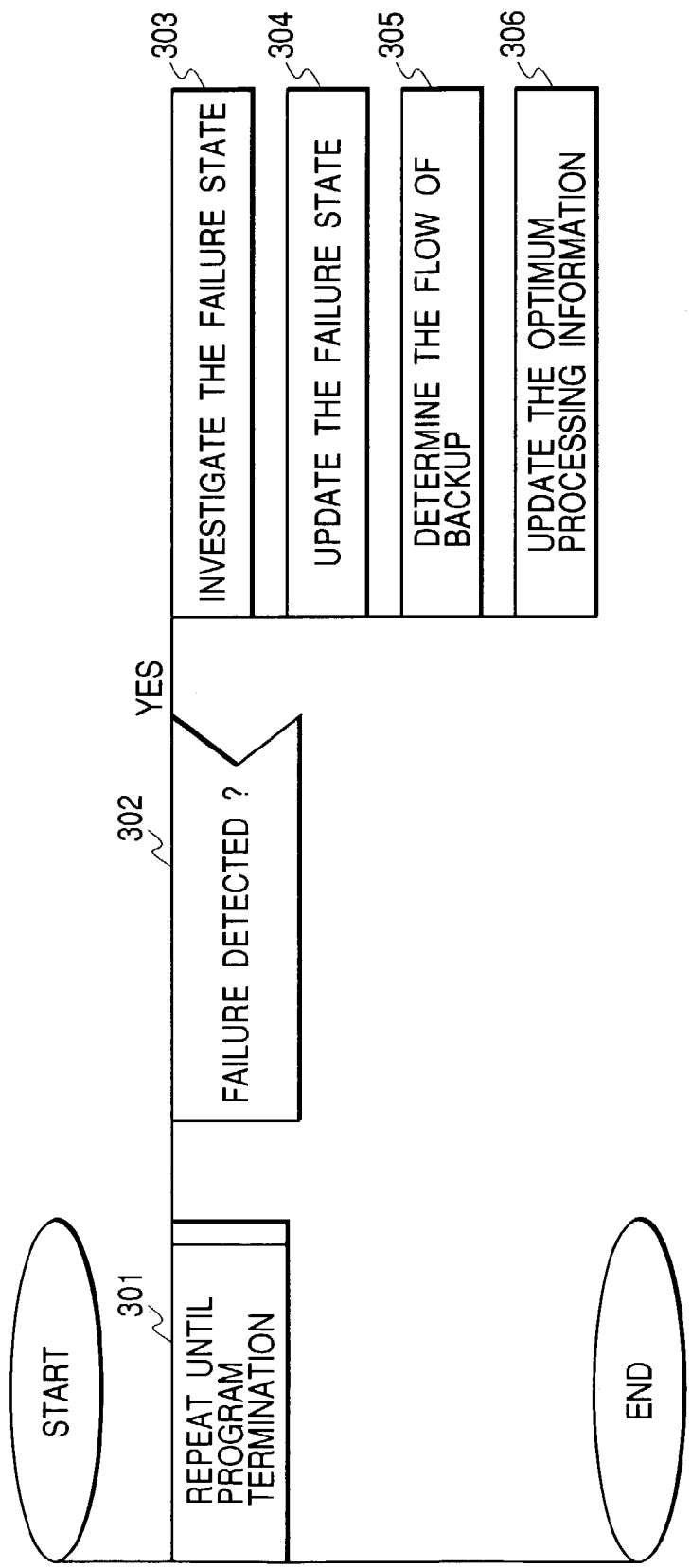
FIG. 3 is a PAD illustrating the processing steps that are performed by a backup system management program according to one embodiment.

FIG. 3 is a PAD (Problem Analysis Diagram) that outlines the processing steps performed by the backup system management program 208 according to a first embodiment of the present invention.

When activated upon receipt of a program start or other instruction from the instruction input device 202, the backup system management program 208 enters a loop for monitoring the failure states of the other devices connected to the network 109 (step 301).

In step 302, the program 208 checks for a failure. Upon detection of a failure, the program 208 branches to the step 303 process. If no failure is detected, the program 208 enters the step 301 loop. The program 208 concludes that a failure has occurred when it receives a failure notification or detects a device that has gone down and is not responding.

In step 303, the program 208 determines the layer in which the failure occurred and the severity of the failure. If a failure notification was received in step 302, the program 208 determines the failure occurrence layer and severity in accordance with the contents of the failure notification. If the contents of the failure notification are not adequate for determining the failure occurrence location when, for instance, the failure notification was received from the primary storage 103, which handles more than one layer, the program 208 requests a faulty device to furnish detailed failure information and then determines the location and severity of the failure. If the program received no failure notification but could not confirm normality in step 302, the above investigation sequence need not be performed because it is obvious that the fault occurred in a layer for a non-responding device.

In step 304, the program 208 reads the failure state management information 211, and updates the associated information so as to reflect the failure occurrence location and severity determined in step 303. FIG. 4 shows an example of failure state management information 211. In the example shown in FIG. 4, each line is used to furnish the information about one layer. The layer number is indicated to the left of a comma (,), while the severity of failure is indicated to the right of the comma (OK: normal; ERROR; fatal error; WARNING: warning). If ERROR or WARNING is written in the failure state management information 211 to indicate a failure at a location other than the failure location found in step 303, the program 208 checks whether such a failure is corrected to achieve recovery. If recovery is achieved, the program 208 changes the associated description to "OK", and then records the failure state (failure occurrence location and severity) in the work area 210.

In step 305, the program 208 reads the failure processing information 212 and determines the backup flow that is appropriate for the encountered failure. FIG. 5 shows an example of failure processing information 212. In the example shown in FIG. 5, the process appropriate for a failure is written in each line. From left to right, the four comma-separated entries in each line indicate the failure state, the instruction issued to the second layer, the instruction issued to the third layer, and the instruction issued to the fourth layer. FIG. 6 shows the table that is referenced to determine the process to be performed in the event of a failure. This table illustrates the relationship between failures and processes performed in various layers. Files indicated in FIG. 5 under the name of "c:¥JOB1_1", "c:¥JOB2_1", or the like are script files, which are prepared to define the instructions to be issued to various layers in the event of a failure. The contents of these script files are summarized in FIG. 7. The information related to a failure state, which was recorded in the work area 210 in step 304, is read from the failure processing information 212 in order to acquire the processing information appropriate for the currently encountered failure. The hierarchical backup system of the present embodiment uses mirroring for the first layer, but does not particularly define the instruction to the first layer. However, if a mirrored disk or mirroring process is to be changed due, for instance, to a mirrored disk failure, the instruction to the first layer may alternatively be defined.

In step 306, the optimum processing information 213, which describe the manner of giving instructions to various layers, are updated in accordance with the processing information acquired in step 305. However, if the failure state management information 211 was not changed in step 304, the optimum processing information 213 need not be updated in step 306. As described earlier, the backup execution instruction program 209 reads the optimum processing information 213 and instructs various devices to perform an optimum backup process. FIG. 8 shows an example of optimum processing records 213. In the example shown in FIG. 8, the instructions to a layer are written in each line. From left to right, the three comma-separated entries in each line indicate the layer number, the instruction issue period (1 h: 1 hour; 1 d: 1 day; 1 w: 1 week), and the name of a script file containing an instruction description. The backup execution intervals can be varied according to the properties of the data to be backed up.

Figure 9:
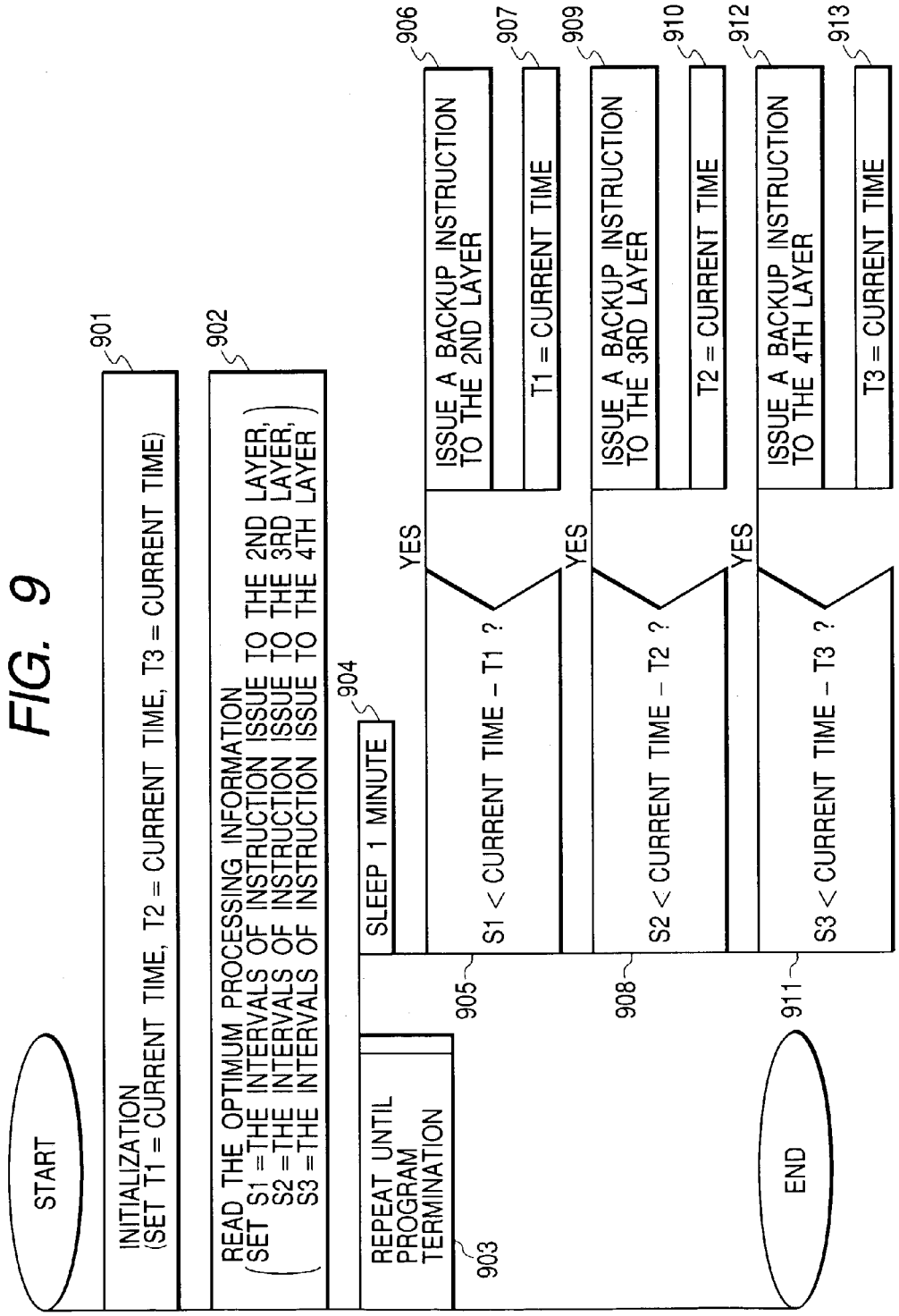
FIG. 9 is a PAD illustrating the processing steps that are performed by a backup execution instruction program according to one embodiment.

FIG. 9 is a PAD that outlines the processing steps to be performed by the backup execution instruction program 209 according to the first embodiment of the present invention.

The backup execution instruction program 209 is activated by a program start or other instruction from the instruction input device 202 to set the current time in variables T1, T2, and T3 (step 901).

In step 902, the backup execution instruction program 209 reads the optimum processing information 213, and sets variable S1 to the value of intervals at which an instruction is issued to the second layer, variable S2 to the value of intervals at which an instruction is issued to the third layer, and variable S3 to the value of intervals at which an instruction is issued to the fourth layer. Further, the program 209 uses the work area 210 to store the storage locations of script files, which describe the instructions to the individual layers.

In step 903, the program 209 enters a loop to repeat processing steps 904 to 913 until program termination.

In step 904, the program 209 sleeps for one minute.

In step 905, the program 209 checks the difference between the current time and T1 (the elapsed time from the instant at which the last instruction to the second layer was issued). If the difference is greater than S1 (the value of intervals at which an instruction is issued to the second layer), the program 209 branches to step 906.

In step 906, the program 209 issues an instruction to the primary storage 103 by executing a script file that was saved in step 902 to record an instruction to the second layer.

In step 907, the program 209 sets the current time in variable T1.

In step 908, the program 209 checks the difference between the current time and T2 (the elapsed time from the instant at which the last instruction to the third layer was issued). If the difference is greater than S2 (the value of intervals at which an instruction is issued to the third layer) the program 209 branches to step 909.

In step 909, the program 209 issues an instruction to backup server 105 by executing a script file that was saved in step 902 to record an instruction to the third layer.

In step 910, the program 209 sets the current time in variable T2.

In step 911, the program 209 checks the difference between the current time and T3 (the elapsed time from the instant at which the last instruction to the fourth layer was issued). If the difference is greater than S3 (the value of intervals at which an instruction is issued to the fourth layer), the program 209 branches to step 912.

In step 912, the program 209 issues an instruction to backup server 106 by executing a script file that was saved in step 902 to record an instruction to the fourth layer.

In step 913, the program 209 sets the current time in variable T3.

The management server 101 of the present embodiment is as described above.

Backup servers 105 and 106 of the present embodiment will now be described.

Figure 10:
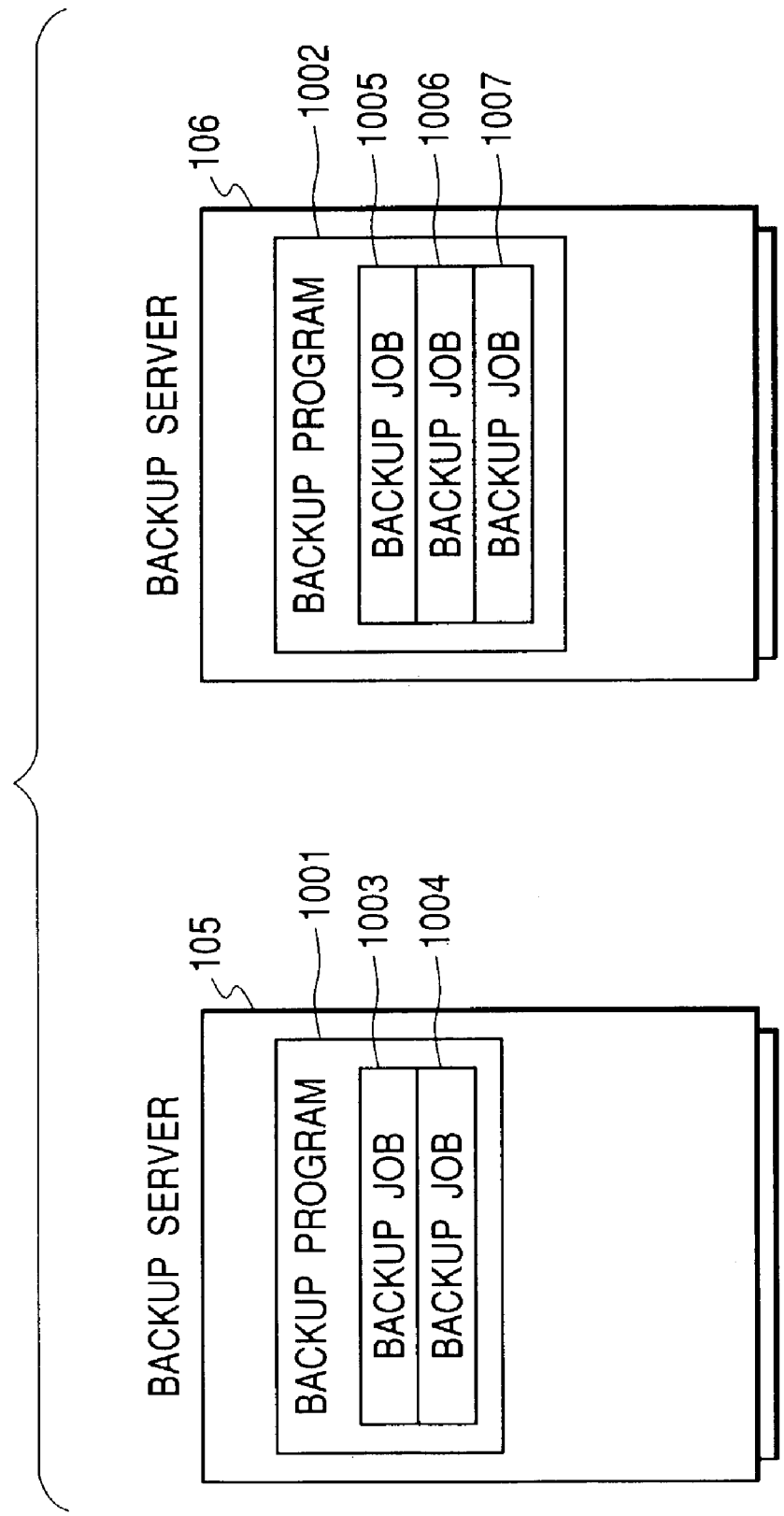
FIG. 10 schematically illustrates the functions of backup servers 105 and 106 according to one embodiment.

FIG. 10 outlines the functions of backup servers 105 and 106.

Backup server 105 includes backup program 1001. Backup server 106 includes backup program 1002. Backup programs 1001 and 1002 can define a plurality of backup jobs for which the data to be backed up and the storage location of backup data are set. These backup jobs can be called up from a command line interface. This function is not described herein because it is already implemented as a function of general backup software.

Backup program 1001 defines backup jobs 1003 and 1004, whereas backup program 1002 defines backup jobs 1005, 1006, and 1007. For backup job 1003, the data in the second layer is set as the data to be backed up and the secondary storage 104 is set as the backup data storage location. For backup job 1004, the data in the first layer is set as the data to be backed up and the secondary storage 104 is set as the backup data storage location. For backup job 1005, the data in the third layer is set as the data to be backed up and the magnetic tape library 107 set as the backup data storage location. For backup job 1006, the data in the second layer is set as the data to be backed up and the magnetic tape library 107 set as the backup data storage location. For backup job 1007, the data in the first layer is set as the data to be backed up and the magnetic tape library 107 set as the backup data storage location. All these backup jobs are executed by the backup execution instruction program 209.

The backup servers 105, 106 of the present embodiment are as described above.

As described above, the backup method described according to the present embodiment makes it possible to flexibly change the backup flow and backup execution intervals in accordance with the failure location and severity when a failure occurs in a certain layer of a hierarchical backup system. As a result, the influence of failures can be minimized to provide a high-availability hierarchical backup system.

What is claimed is:

1. A backup method for use in a hierarchical backup system constructed by hierarchically combining a plurality of backup procedures, where each backup procedure backs up data stored in a higher layer device to produce backup data to be stored in a lower layer device, the method comprising steps of:

storing failure processing information representative of a backup workflow comprising a combination of those backup procedures which correspond to states of the devices;

investigating the states of the devices to alter the backup workflow; and determining the backup workflow in accordance with a result of the investigation by referencing the failure processing information;

wherein each of the backup procedure is accompanied by a time interval at which the backup procedure is executed;

wherein a backup execution is issued simultaneously at a time of backup execution to all devices comprising in the backup system in accordance with said time interval.

2. The backup method according to claim 1, wherein a backup execution instruction is issued at a time of backup execution to all devices composing the backup system in accordance with the determined backup workflow.

3. A backup method for use in a hierarchical backup system constructed by hierarchically combining a plurality of backup processes in an arrangement of layer, where the backup process backs up data stored in a backup device in a higher layer to produce backup data for a backup device in a lower layer, the method comprising steps of:

for each layer, checking whether a backup device in said layer experienced a failure;

skipping a first layer if a failure occurs in the first layer, and instructing each of the backup processes in the layers higher than the first layer and in layers lower than the first layer to perform a backup operation; and changing one or more time intervals at which a backup operations are performed in the lower layers;

wherein each of the backup process is accompanied by a time interval at which the backup process is executed;

wherein a backup execution is issued simultaneously at a time of backup execution to all devices comprising in the backup system in accordance with said time interval.

4. The backup method according to claim 3, wherein the intervals at which the backup operation is performed are changed in accordance with data to be backed up.

5. A backup method for use in a hierarchical backup system constructed by hierarchically combining a plurality of backup procedures in an arrangement of layer, where said backup procedure backs up data stored either in a device or a backup device of a higher layer to produce backup data to be stored in a backup device of a lower layer, the method comprising steps of:

storing failure processing information that defines a combination of the backup procedures corresponding to the states of the devices including failure states;
examining the states of the devices when the system activates a series of backup operations; and
determining one combination of the backup procedures by referencing the failure processing information in accordance with a result of the examination;

wherein each of the backup procedure is accompanied by a time interval at which the backup procedure is executed;
wherein a backup execution is issued simultaneously at a time backup execution to all devices comprising in the backup system in accordance with said time interval.

* * * * *